(12) United States Patent
Nigro et al.

(10) Patent No.: US 10,489,741 B1
(45) Date of Patent: Nov. 26, 2019

(54) WIRELESS SCANNERS FOR MAINTAINING INVENTORY

(71) Applicant: GOOGLE LLC, Mountain View, CA (US)

(72) Inventors: Lorenzo Nigro, San Francisco, CA (US); Joyce Lee, San Francisco, CA (US); Valery Miftakhov, San Carlos, CA (US); Colin Bookman, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 265 days.

(21) Appl. No.: 15/181,381

(22) Filed: Jun. 13, 2016

(51) Int. Cl.
*G06K 5/00* (2006.01)
*G06Q 10/08* (2012.01)
(Continued)

(52) U.S. Cl.
CPC ....... *G06Q 10/087* (2013.01); *G06K 7/10366* (2013.01); *G06K 19/07758* (2013.01)

(58) Field of Classification Search
CPC ............ H05B 37/0227; H05B 33/0854; H05B 33/0872; H05B 37/0272; H05B 37/0245; G06K 7/0008; G06K 7/10039; G06K 7/10108; G06K 7/10356; G06K 17/00; G06K 19/0713; G06K 19/0723; G06K 19/07749; G06K 19/07767; G06K 19/07309; G06K 7/10198; G06K 17/0022; G06K 2009/00738; G06K 7/10297; G06K 9/00711; G06K 9/00718; G06K 9/00765; G06K 9/00771; G06K 9/3241; G06K 7/10009; G06K 19/06037; G06K 19/0614; G06K 7/10158; G06K 19/06028; G06K 19/06084; G06K 19/07758; G06K 19/10; G06K 7/10366; G06K 19/0716; G06K 19/0717; G06K 19/07754; G06K 19/07766; G06K 19/07771; G06K 19/07773;
(Continued)

(56) References Cited

U.S. PATENT DOCUMENTS

| 8,077,041 B2 | 12/2011 | Stern et al. |
| 2002/0149416 A1* | 10/2002 | Bandy .................. G06K 7/0008 327/536 |

(Continued)

OTHER PUBLICATIONS

"EPC™ Radio-Frequency Identity Protocols Class-1 Generation-2 UHF RFID Protocol for Communications at 860 MHz-960 MHz", Specification for EFID Air Interface, Version 1.0.9, Jan. 2005, 94 pages.

(Continued)

*Primary Examiner* — Thien T Mai
(74) *Attorney, Agent, or Firm* — Johnson, Marcou & Isaacs, LLC

(57) ABSTRACT

A system for maintaining inventory in a retail store may comprise multiple wireless readers. The multiple wireless readers may be distributed throughout the retail store so that every location within a coverage area of the system is within boundaries of at least two wireless readers. Each of the multiple wireless readers may be configured to send polling requests to tags within the coverage area, read responses from the tags, the responses identifying the respective tags, and send identities of the tags to a remote server.

11 Claims, 12 Drawing Sheets

(51) Int. Cl.
*G06K 19/077* (2006.01)
*G06K 7/10* (2006.01)

(58) Field of Classification Search
CPC .......... G06K 7/10059; G06K 7/10069; G06K 7/10376; G06K 9/00577; G06K 9/00677; G06K 9/62; G06K 9/6203; G06K 17/0025; G06K 19/04; G06K 19/06187; G06K 19/07; G06K 19/145; G06K 19/18; G06K 2009/0059; G06K 7/10227; G06K 7/10762; G06K 9/00221; G06Q 10/087; G06Q 30/02; G06Q 10/10; G06Q 30/0185; G06Q 20/18; G06Q 30/0251; G06Q 30/0261; G06Q 50/01; G06Q 50/06; G06Q 50/26; G06Q 20/3829; G06Q 30/00; G06Q 30/0201; G06Q 50/34; H04L 9/3271
See application file for complete search history.

(56) References Cited

U.S. PATENT DOCUMENTS

| | | |
|---|---|---|
| 2004/0143505 A1 | 7/2004 | Kovach et al. |
| 2006/0022800 A1* | 2/2006 | Krishna ............... G06K 7/0008 340/10.2 |
| 2007/0109099 A1* | 5/2007 | Raphaeli ............... G01S 13/758 340/10.2 |
| 2007/0241906 A1 | 10/2007 | Malik et al. |
| 2009/0009334 A1 | 1/2009 | Smith et al. |
| 2009/0045911 A1* | 2/2009 | Bauchot ............. G06Q 20/3674 340/5.8 |
| 2012/0161967 A1 | 6/2012 | Stern et al. |
| 2016/0360594 A1* | 12/2016 | Chemel ............. H05B 37/0227 |

OTHER PUBLICATIONS

"Understanding EPC Gen2 Search Modes and Sessions", IMPINJ (https://support.impint.com/hc/en-us/articles/202756158-Understanding-EPC-Gen2-Search-Modes-and-Sessions), Feb. 26, 2016, 7 pages.

Bonsor, "How RFID Works", How Stuff Works (http://electronics.howstuffworks.com/gadgets/high-techgadgets/rfid.htm), Feb. 18, 2016, 18 pages.

Derakhshan, et al., "RFID Data Management: Challenges and Opportunities", 2007 IEEE International Conference on RFID, Gaylord Texan Resort, Grapevine, TX, USA, Mar. 26-28, 2007, WeAT2.3, pp. 175-182.

* cited by examiner

Tag Memory 400

| Identifier 402 | State 404 | Bucket Number 406 |
|---|---|---|

FIG. 4A

Reader Table 410

| Identity 412 | State 414 | Bucket Number 416 | Signal Strength 418 | Time 420 |
|---|---|---|---|---|
|  |  |  |  |  |
|  |  |  |  |  |
|  |  |  |  |  |
|  |  |  |  |  |

FIG. 4B

Reader Message 430

| Reader Table 432 | Reader Identifier 434 | Reader Location 436 |
|---|---|---|

FIG. 4C

Server Table 440

| Identity 442 | Location 444 | Time 446 |
|---|---|---|

FIG. 4D

Server Table 440

| Identity 442 | Location 444 | Time 446 |
|---|---|---|
| 0 | A | 0.1 |
| 1 | B | 0.2 |
| 0 | A | 0.3 |
| 1 | B | 0.4 |
| 2 | C | 0.1 |
| 2 | C | 0.5 |

FIG. 6A

Server Table 440

| Identity 442 | Location 444 | Time 446 |
|---|---|---|
| ~~0~~ | ~~A~~ | ~~0.1~~ |
| ~~1~~ | ~~B~~ | ~~0.2~~ |
| 0 | A | 0.3 |
| 1 | B | 0.4 |
| ~~2~~ | ~~C~~ | ~~0.1~~ |
| 2 | C | 0.5 |

FIG. 6B

Server Table 440

| Identity 442 | Location 444 | Time 446 |
|---|---|---|
| 0 | A | 0.3 |
| 1 | B | 0.4 |
| 2 | C | 0.5 |

FIG. 6C

WIRELESS SCANNERS FOR MAINTAINING INVENTORY

TECHNICAL FIELD

This description relates to wireless scanners for maintaining inventory.

BACKGROUND

Wireless scanners, or readers, may detect the presence of tags. If the scanners fail, replacing the scanners may be cumbersome, resulting in some tags going undetected.

SUMMARY

A system for maintaining inventory in a retail store may comprise multiple wireless readers. The multiple wireless readers may be distributed throughout the retail store so that every location within a coverage area of the system is within boundaries of at least two wireless readers. Each of the multiple wireless readers may be configured to send polling requests to tags within the coverage area, read responses from the tags, the responses identifying the respective tags, and send identities of the tags to a remote server.

According to an example, a wireless reader may include at least one transceiver, at least one processor, and at least one memory. The at least one transceiver may be configured to transmit and receive wireless signals. The at least one processor may be configured to execute instructions stored in memory and generate and process signals transmitted and received by the at least one transceiver. The at least one memory may include instructions stored thereon. When executed by the at least one processor, the instructions may be configured to cause the wireless reader to at least send multiple polling requests to multiple tags in a first cycle, the polling requests in the first cycle each identifying a different bucket number within a range of bucket numbers and instructing tags with a first state and the identified bucket number to respond with their respective identifier and switch to a second state opposite from the first state, and after sending the multiple polling requests in the first cycle, send multiple polling requests to the multiple tags in a second cycle, the polling requests in the second cycle each identifying a different bucket number within the range of bucket numbers and instructing tags with the second state and the identified bucket number to respond with their respective identifier and switch to the first state opposite from the second state.

According to an example, a method may include receiving, by a server, multiple inventory reports from multiple wireless readers. Each of the multiple inventory reports may indicate presence of a retail item at a physical location of a retail store. The method may also include determining inventory at the physical location of the retail store based on the received multiple inventory reports. The determination of the inventory may be based on filtering cumulative reports of the retail item. The method may include determining that a user is interested in the retail item that is present at the physical location of the retail store. The method may include sending an advertisement for the retail item and location information about the retail store to the user based on the determination that the user is interested in the retail item that is present at the physical location of the retail store.

According to an example, a wireless reader may include means for transmitting and receiving wireless signals. The wireless reader may include means for executing stored instructions generating and process signals transmitted and received by the means for transmitting and receiving wireless signals. The wireless reader may include means for storing instructions to at least send multiple polling requests to multiple tags in a first cycle, the polling requests in the first cycle each identifying a different bucket number within a range of bucket numbers and instructing tags with a first state and the identified bucket number to respond with their respective identifier and switch to a second state opposite from the first state, and after sending the multiple polling requests in the first cycle, send multiple polling requests to the multiple tags in a second cycle, the polling requests in the second cycle each identifying a different bucket number within the range of bucket numbers and instructing tags with the second state and the identified bucket number to respond with their respective identifier and switch to the first state opposite from the second state.

According to an example, a server may include means for receiving multiple inventory reports from multiple wireless readers. Each of the multiple inventory reports may indicate presence of a retail item at a physical location of a retail store. The server may also include means for determining inventory at the physical location of the retail store based on the received multiple inventory reports. The determination of the inventory may be based on filtering cumulative reports of the retail item. The server may also include means for determining that a user is interested in the retail item that is present at the physical location of the retail store. The server may also include means for sending an advertisement for the retail item and location information about the retail store to the user based on the determination that the user is interested in the retail item that is present at the physical location of the retail store.

The details of one or more implementations are set forth in the accompa-nying drawings and the description below. Other features will be apparent from the description and drawings, and from the claims.

BRIEF DESCRIPTION OF THE DRAWINGS

FIG. 4A shows tag memory that may be stored in a tag according to an example embodiment.

FIG. 4B shows a reader table that may be stored in a reader according to an example embodiment.

FIG. 4C shows a reader message that a reader may send to a server according to an example embodiment.

FIG. 4D shows a server table that a server may generate based on received reader messages according to an example embodiment.

FIG. 6A shows a server table with fields populated according to an example embodiment.

FIG. 6B shows the server table of FIG. 6A with redundant fields filtered according to an example embodiment.

FIG. 6C shows the server table after the redundant fields have been filtered according to an example embodiment.

DETAILED DESCRIPTION

Wireless scanners, or readers (or wireless readers), may be installed in a high density network within a retail store. The readers may scan for tags attached to merchandise. The high density of the readers may cause coverage areas of the readers to overlap, creating redundancy in coverage by the readers, with multiple readers receiving signals indicating presence of each tag and associated merchandise. The redundancy may maintain a high accuracy in detecting tags, even if one or more readers fails.

Figure 1A:
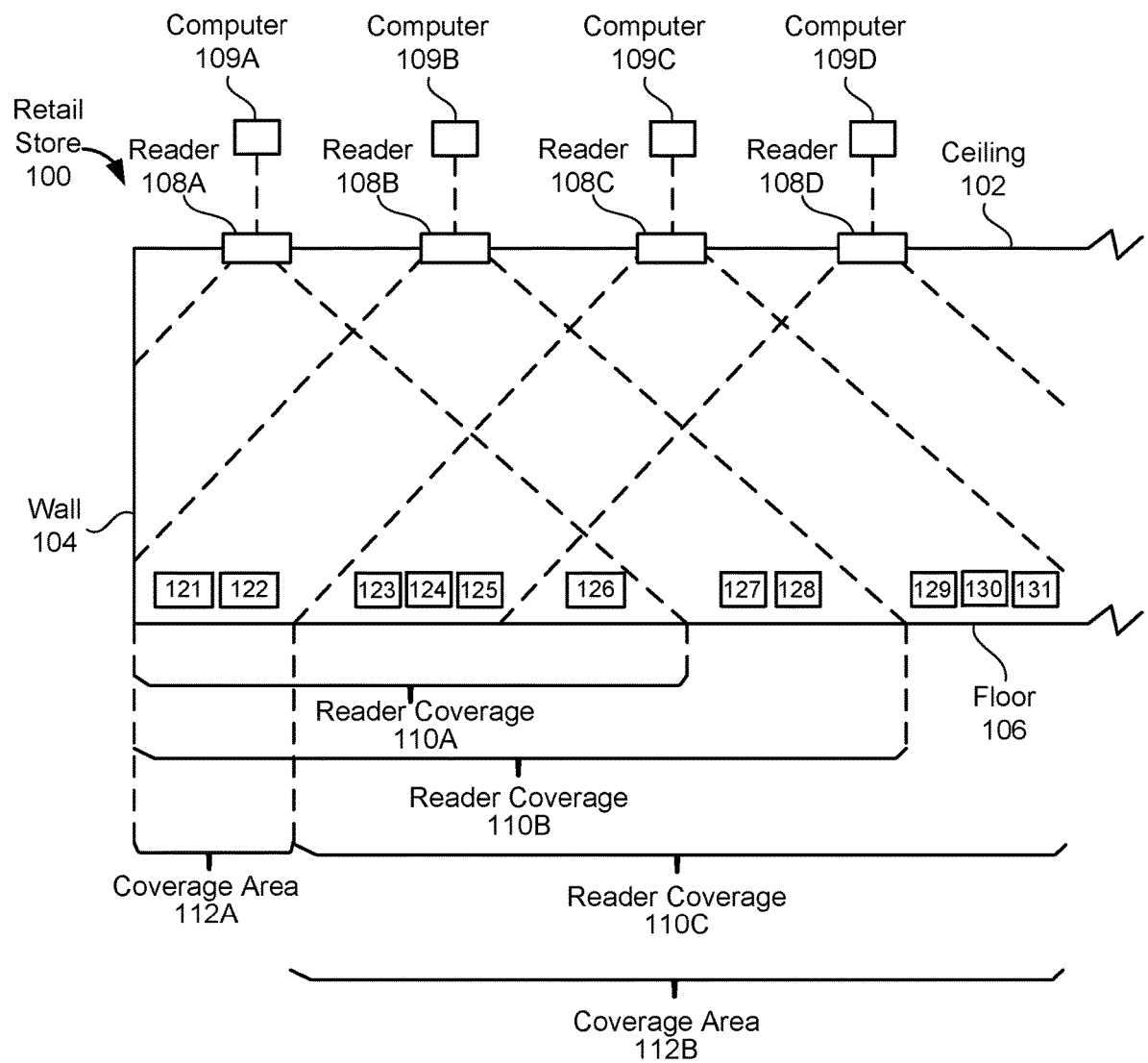
FIG. 1A is a diagram showing readers in a retail store according to an example embodiment.

FIG. 1A is a diagram showing wireless readers 108A, 108B, 108C, 108D (collectively "readers 108") in a retail store 100 according to an example embodiment. The multiple readers 108 may be part of a system for maintaining inventory in the retail store. The readers 108 may be distributed throughout the retail store 100 so that every location within a coverage area of the system for maintaining inventory is within boundaries of at least a threshold numbers, such as two or three, wireless readers 108.

The readers 108 may include wireless scanners, such as Radio Frequency Identification (RFID) readers. The readers 108 may each independently send polling requests to tags 121, 122, 123, 124, 125, 126, 127, 128, 129, 131, 131 (collectively "tags 121-131") within their respective coverage areas, read responses from the tags 121-131, the responses identifying the respective tags 121-131 and the associated items and/or merchandise, and send identities of the responding tags 121-131 to a remote server 208 (shown in FIG. 2).

The tags 121-131 may include electronic devices that receive wireless signals from the readers 108 such as polling requests, process the wireless signals, and respond to the received wireless signals by sending wireless signals such as identities to the readers 108. The tags 121-131 may include, for example, RFID tags. The tags 121 may each be attached to, associated with, and/or identify a single merchandise item.

The readers 108 may have overlapping coverage areas to achieve redundancy of coverage and still maintain high accuracy even when one or more readers 108 fails. The readers 108 may be mounted in a ceiling 102 of the retail store 100, and/or may be mounted to lighting fixtures which are mounted in the ceiling 102. In an example in which the ceiling 102 is approximately fifteen feet (15') from a floor 106 of the retail store 100, the readers 108 have forty-five degree (45°) arcs of coverage, the readers 108 are spaced between four and five feet apart on the ceiling 102, and the readers 108 have ranges of coverage on the floor 106 of between ten and fifteen feet, a coverage area including every location on the floor 106 may be covered by at least two readers 108, and a coverage area including every location on the floor 106 that is at least a threshold distance from a wall 104 connecting the ceiling 102 to the floor 106 may be covered by at least three readers 108.

In the example shown in FIG. 1A, the reader's 108A coverage area 110A includes tags 121, 122, 123, 124, 125, 126, the reader's 108B coverage area 110B includes tags 121, 122, 123, 124, 125, 126, 127, 128, and the reader's 108C coverage area 11C includes tags 123, 124, 125, 126, 127, 128, 129, 130, 131. Other readers, such as reader 108D, may have similar coverage areas. A coverage area 112A that is adjacent to the wall 104 may have all locations covered by at least two readers 108A, 108B (tags 121, 122 are covered by readers 108A, 108B), and a coverage area 112B that is at least a threshold distance from the wall 104 may have all locations covered by at least three readers (tags 123, 124, 125 are covered by readers 108A, 108B, 108C, tag 126 is covered by readers 108A, 108B, 108C, 108D, tags 127, 128 are covered by readers 108B, 108C, 108D, and tags 129, 130, 131 are covered by readers 108C, 108D and one or more readers not shown in FIG. 1A). While FIG. 1A shows the retail store 100 in two dimensions for illustrative purposes, the readers 108 and tags 121-131 may also extend in a third dimension toward or away from the viewer of the figure. Also, the retail store 100 may continue to extend to the right, as shown by the broken lines.

The system may also include multiple computers 109A, 109B, 109C, 109D (collectively "computers 109"). The computers 109 may include embedded computers. Each computer 109 may be associated with and/or dedicated to a single reader 108. The computers may send reader messages 430 (shown in FIG. 4C) for their associated readers 108 to a server 208 (shown in FIG. 2). Functions described with respect to a reader 108 or computer 109 may be performed by any combination of the reader 108 and computer 109. Associating a computer 109 with each reader 108 may improve the resilience of the system by enabling the remaining readers 108 and associated computers 109 in the system to continue scanning for tags even if one or more computers 109 fails.

Figure 1B:
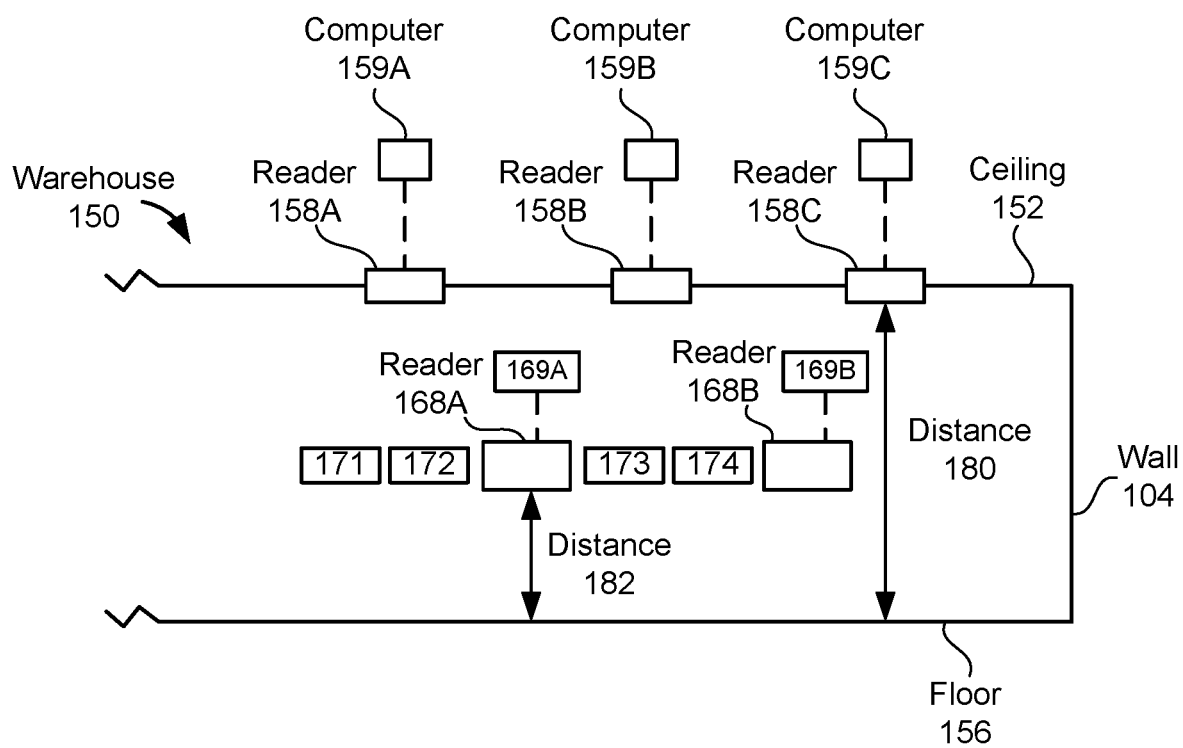
FIG. 1B is a diagram showing readers in a warehouse of the retail store according to an example embodiment.

FIG. 1B is a diagram showing readers 158A, 158B, 158C (collectively "readers 158"), 168A, 168B (collectively readers 168) in a warehouse 150 of the retail store 100 according to an example embodiment. The warehouse 150 may be adjacent to the portion of the retail store 100 shown in FIG. 1A. The warehouse 150 may, for example, share a wall 104 with the portion of the retail store 100 shown in FIG. 1A. The warehouse 150 may store items used to maintain and/or replenish inventory which is sold or otherwise removed from the portion of the retail store 100 shown in FIG. 1A, where customers enter and shop. The warehouse 150 may also extend further to the left, as shown by the broken lines.

The readers 158, 168 may have similar functionalities as the readers 108 described above with respect to FIG. 1A. The warehouse 150 may also include computers 159A, 159B, 159C, 169A, 169B with similar functionalities as the computers 109 described above with respect to FIG. 1A, with each computer 159A, 159B, 159C, 169A, 169B associated with a single reader 158, 168. The warehouse 150 may also include tags 171, 171, 173, 174 attached to, associated with, and/or identifying merchandise, and may have similar functionalities as the tags 121-131 described above with respect to FIG. 1A.

A first set of the readers 158 may be a first distance 180 from a floor 156 of the warehouse 150, and a second set of the readers 168 may be a second distance 182 from the floor 156. The first distance 180 may be different than the second distance 182. The first set of readers 158 may, for example, all be approximately a same distance and/or the first distance 180 from the floor 156 and/or may be mounted in the ceiling 152, such as having distances from the floor 156 that are within two feet of each other. The second set of readers 168 may all be approximately a same distance and/or the second distance 182 from the floor 156, such as having distances from the floor 156 that are within two feet of each other, and/or may be approximately a same distance 182, such as within two feet, from the floor 156 as the tags 171-174. In an example embodiment, the merchandise to which the tags 171-174 are attached are hanging from racks, as in an example of clothing. The first distance 180 may be at least three feet different than the second distance 182. The different distances 180, 182 may increase the redundancy of coverage of the readers 158, 168 and/or provide readings from different locations, increasing the likelihood that a given tag 171-174 will be detected by at least one reader 158, 168.

Figure 2:
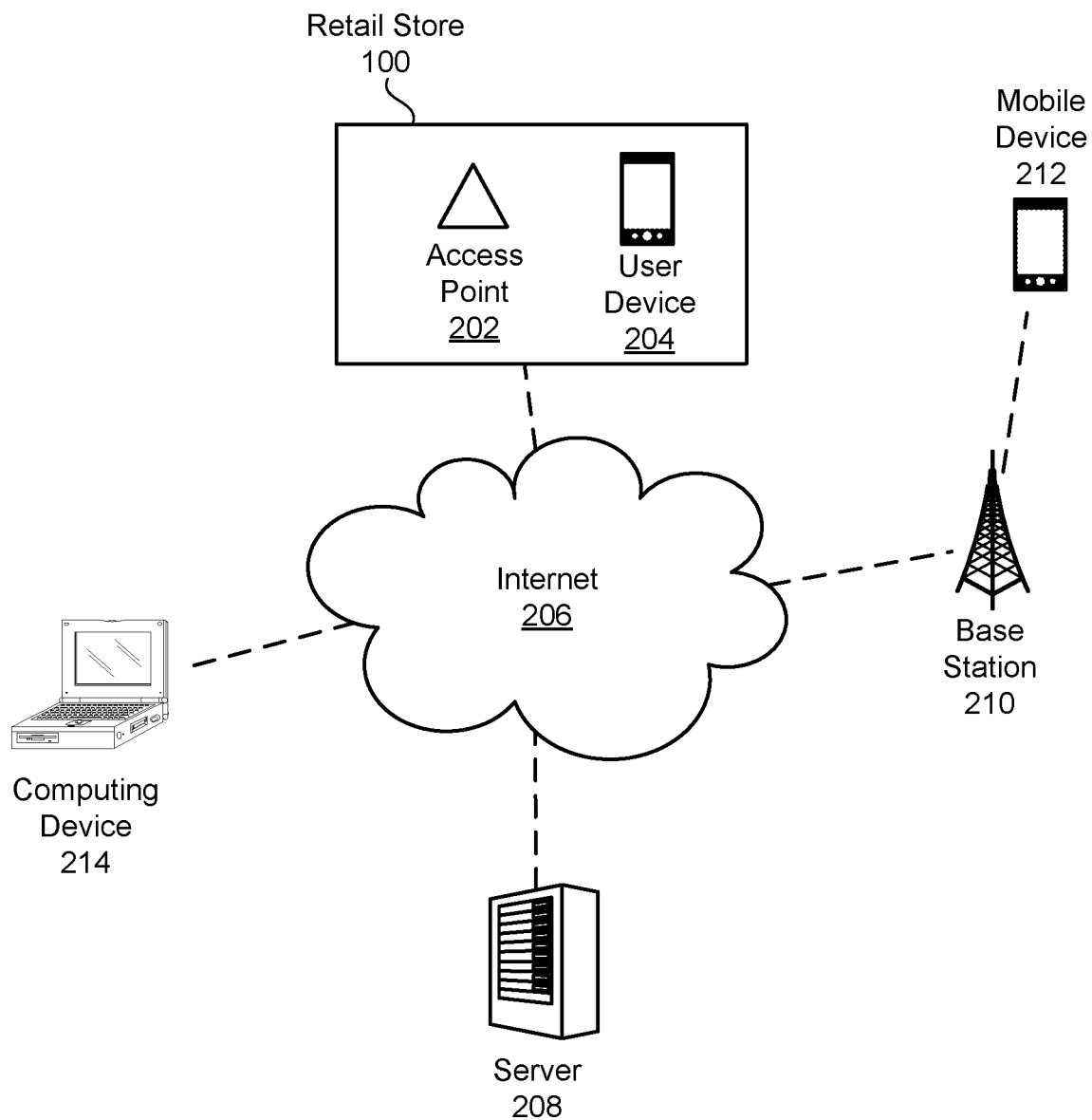
FIG. 2 is a network diagram showing the retail store and devices in communication with readers in the retail store according to an example embodiment.

FIG. 2 is a network diagram showing the retail store 100 and devices in communication with readers 108, 158, 168 in the retail store 100 according to an example embodiment. The retail store 100 may include an access point 202 which wirelessly communicates with the computers 109, 159, 169, one or more user devices 204 such as smartphones which may communicate with the access point 202 via the Internet, as well as the other devices which were shown and described with respect to FIGS. 1A and 1B.

The readers 108, 158, 168 may generate and send reports indicating which tags 121-131, 171-174 that the readers 108, 158, 168 have detected to the access point 202. The readers 108, 158, 168 may send the reports to the access point 202 via a wireless communication protocol, such as Institute for Electrical and Electronics Engineers (IEEE) 802.11 ("WiFi"). The access point 202 may compile and send the reports to a server 208 via the Internet 206. The server 208 may compile the reports, filter redundant reports of tags, and generate tables and/or reports of inventory for the retail store 100.

An administrator or manager of the retail store 100 may access and/or view the reports of inventory by accessing the server 208 from a computing device 214 via the Internet 206. The administrator or manager may determine whether to send additional inventory to the retail store 100 based on the reports of inventory.

A user of a mobile device 212 may be near and/or proximal to the retail store 100, and a base station 210 in communication with the mobile device 212 may reports the user's location to the server 208. The base station 210 may report the user's proximity to the retail store 100 to the server 208 via the Internet 206. Based on the user's proximity to the retail store 100 and the user's web browsing history (which may indicate interest in merchandise at the retail store 100), the server 208 may send to the user one or more advertisements and/or notifications for merchandise that the access point 202, computers 109, 159, 169 and/or readers 108, 158, 168 have reported as present at the retail store 100. The user's web browsing history may include search queries into a search engine, websites visited, hyperlinks clicked on within webpages, and/or interactions with webpages. By maintaining inventory in real-time, the system may direct customers to the retail store 100 when the retail store has merchandise that matches the user's interest, and not direct customers to the retail store 100 when the retail store does not have merchandise that matches the user's interest.

Figure 3A:
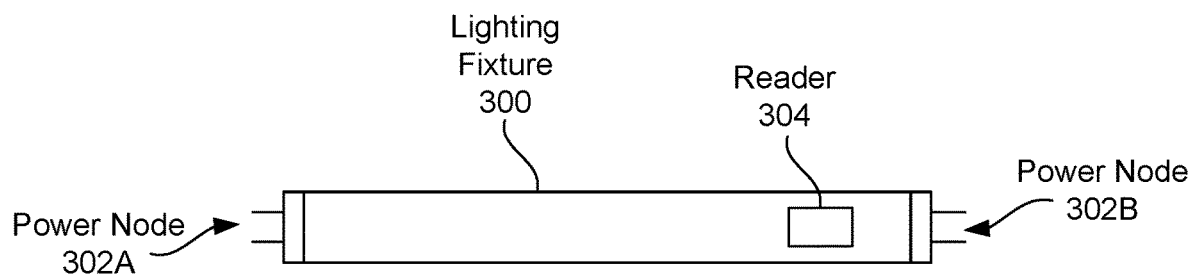
FIG. 3A is a diagram of a lighting fixture with a reader that may communicate with a tag according to an example embodiment.

FIG. 3A is a diagram of a lighting fixture 300 with a reader 304 that may communicate with a tag according to an example embodiment. The lighting fixture 300 may include any lighting fixture, such as a light bulb. The lighting fixture 300 may be installed into any ceiling 102, 152 of the retail store 100. The lighting fixture 300 may draw power via power nodes 302A, 302B from electrical sockets in the ceiling 102, 152.

A reader 304 may be attached to and/or included in the lighting fixture 300. The reader 304 may include the functionality of the readers 108, 158, 168 described above. The reader 304 may draw power from the lighting fixture 300 and/or from the same electrical socket as the lighting fixture 300. Drawing power from the lighting fixture 300 and/or from the same electrical socket as the lighting fixture 300 may enable the reader 304 to be easily installed in the retail store 100 without needing to add any power sources to the retail store 100. Including the reader 304 in, and/or attaching the reader 304 to, the lighting fixture 300, may literally make replacing a failed reader 304 as easy as changing a light bulb.

Figure 3B:
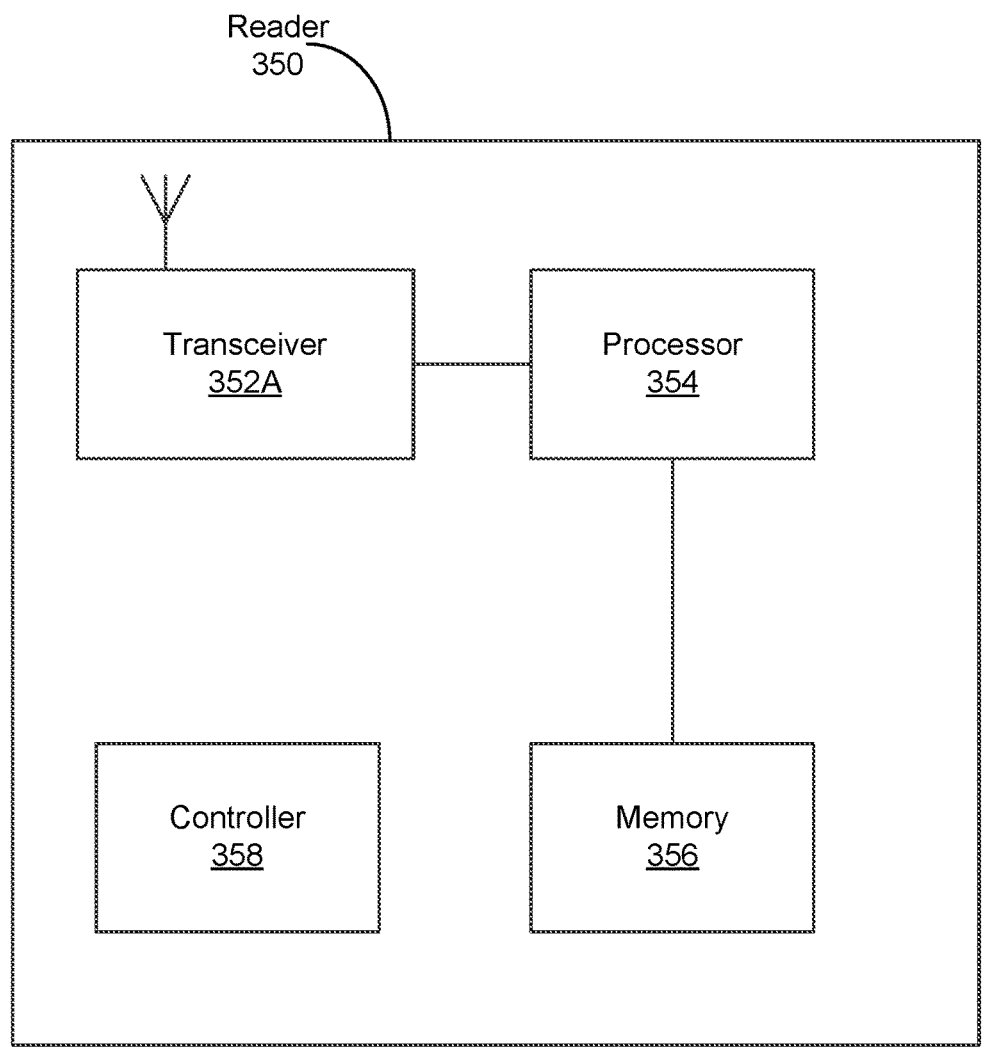
FIG. 3B is a diagram of a wireless reader according to an example embodiment.

FIG. 3B is a diagram of a wireless reader 350 according to an example embodiment. The reader 350 may be an example of any of the readers 108, 158, 168, 304 described herein. The reader 350 may include, for example, a wireless transceiver 352, where the wireless transceiver includes a transmitter to transmit signals and a receiver to receive signals. The wireless transceiver 352 may also measure signal strengths of responses received from tags 121-131, 171-174. The reader 350 also includes a processor or control unit/entity (controller) 354 to execute instructions or software and control transmission and receptions of signals, and a memory 356 to store data and/or instructions, such as instructions to perform any of the methods, functions, or techniques described herein.

Processor 354 may also make decisions or determinations, generate frames, packets or messages for transmission, decode received frames or messages for further processing, and any task, method, technique, and/or function described herein with respect to the readers 108, 158, 168, 304. Processor 354, which may be a baseband processor, for example, may generate messages, packets, frames or other signals for transmission via wireless transceiver 352. Processor 354 may control transmission of signals or messages over a wireless network, and may control the reception of signals or messages via a wireless network. Processor 354 may be programmable and capable of executing software or other instructions stored in memory 356 or on other computer media to perform the various tasks and functions described herein, such as one or more of the tasks or methods described herein. Processor 354 may be (or may include), for example, hardware, programmable logic, a programmable processor that executes software or firmware, and/or any combination thereof. Using other terminology, processor 354 and transceiver 352 together may be considered as a wireless transmitter/receiver system, for example.

In addition, referring to FIG. 3B, a controller (or processor) 358 may execute software and instructions to cause the reader 350 to perform any combination of the functions, methods, techniques, and/or tasks described herein, and may provide overall control for the reader 350. In an example implementation, the processor 354 and controller 358 may be combined into a single processor.

In addition, the memory 356 may include a non-transitory computer-readable storage medium that includes stored instructions, which when executed by a controller or processor may result in the reader 350 performing one or more of the functions or tasks described herein.

FIG. 4A shows tag memory 400 that may be stored in a tag 121-131, 171-174 according to an example embodiment. The memory 400 may store an identifier 402. The identifier 402 may uniquely identify the tag 121-131, 171-174, which may be associated with an item of merchandise. The identifier 402 may have been generated based on a Uniform Product Code (UPC) associated with the item of merchandise, and a serial number identifying the specific item of merchandise (distinguishing the item from otherwise identical items of merchandise). The identifier 402 may uniquely identify a particular item of merchandise, and the UPC code and serial number of the item may be derived from the identifier.

The tag memory 400 may also store a state 404. The state 404 may alternate between a first state and a second state, and/or a state A and a state B. The tag memory 400 may also include a bucket number 406. The bucket number 406 may be a number randomly or pseudorandomly generated by the tag 121-131, 171-174 within a predetermined range that is known to the readers 108, 158, 168, 304, 350. The tag 121-131, 171-174 may respond to a polling request that includes a bucket number matching the bucket number 406 stored in memory 400 and/or includes a state matching the state 404 stored in memory 400 by sending the identifier 402, state 404, and bucket number 406, and alternating the stored state 404 (from the first state or state A to the second state or state B and vice versa). The tag 121-131, 171-174 may ignore a polling request that includes a bucket number different than the bucket number 406 stored in memory 400 and/or a state different than the state 404 stored in memory 400. The tag memory 400 may also include other information that the tags may send to the readers and that the readers may store, such as an antenna number and/or a Medium Access Control (MAC) address of the tag.

FIG. 4B shows a reader table 410 that may be stored in a reader 108, 158, 168, 304, 350 according to an example embodiment. The reader table 410 may be stored in the memory 356. The reader 108, 158, 168, 304, 350 may populate a row based on each received response from a tag 121-131, 171-174. The reader 108, 158, 168, 304, 350 may populate an identity 412 column with an identity value received from the tag 121-131, 171-174, a state 414 either received from the tag 121-131, 171-174 or based on the state included in the polling request, a bucket number 416 included in the polling request, a signal strength 418 of the response to the polling request (which may be used in combination with other measured signal strengths and locations of other readers 108, 158, 168, 304, 350 to determine locations of the tags 121-131, 171-174), and times 420 of receipt of the identities the tags sent as responses to the polling requests.

FIG. 4C shows a reader message 430 that a reader 108, 158, 168, 304, 350 may send to the server 208 according to an example embodiment. Each reader 108, 158, 168, 304, 350 may periodically send a reader message 430 to the server 208. The reader message 430 may include a reader table 432 with the information populated into the reader table 410 since the last reader message 430 was sent to the server 208, a reader identifier 434 identifying the reader 108, 158, 168, 304, 350, and a reader location 436 indicating a location of the reader 108, 158, 168, 304, 350 (which may be used in combination with the signal strengths 418 to determine locations of tags 121-131, 171-174).

FIG. 4D shows a server table 440 that the server 208 may generate based on received reader messages 430 according to an example embodiment. The server table 440 may include multiple rows. Each row may include an identity 442 of the tag 121-131, 171-174, which may be based on the identity 412 included in the reader table 410, 430 a location 444 of the tag 121-131, 171-174, which the server 208 may have determined based on the signal strengths 418 of the tags 121-131, 171-174 and the reader locations 436 of the readers 108, 158, 168, 304, 350 that sent the identities 412 and signal strengths 418, and a time 446 that the tags 121-131, 171-174 identified themselves, which may be based on the time 420 included in the reader table 410, 430.

Figure 5A:
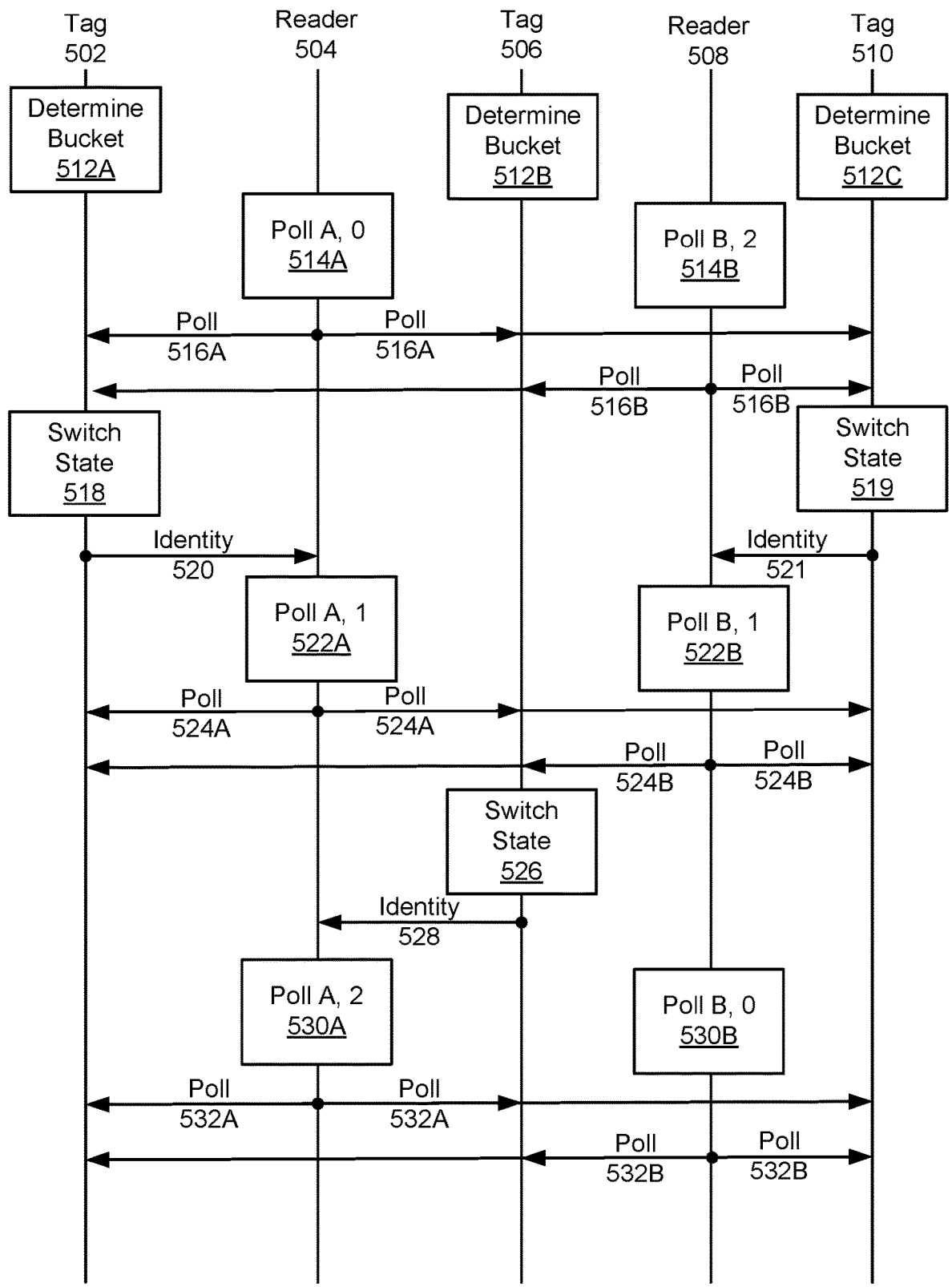
FIG. 5A is a timing diagram showing actions performed by, and messages exchanged between, tags and readers according to an example embodiment.

FIG. 5A is a timing diagram showing actions performed by, and messages exchanged between, tags 502, 506, 510 and readers 504, 508 according to an example embodiment. The polling described with respect to FIGS. 5A and 5B may be performed periodically, such as after predefined intervals of minutes, hours, or days, at predetermined times or times scheduled by the server 208, or in response to polling instructions that the readers 504, 508 receive from the server 208, to determine presence and location of inventory items. The tags 502, 506, 510 and readers 504, 508 may be included in a system for maintaining inventory in a retail store, such as the retail store 100 described above. The tags 502, 506, 510 may have any of the functionalities described herein with respect to the tags 121-131, 171-174, and the readers 504, 506 may have any of the functionalities described herein with respect to the readers 108, 158, 168, 304, 350. While three tags 502, 506, 510 and two readers 504, 508 are shown in FIG. 5A for illustrative purposes, many more tags 502, 506, 510 and readers 504, 408 may be included in the system for maintaining inventory in the retail store 100.

The tags 502, 506, 510 may independently determine their respective bucket numbers (512A, 512B, 512C). The tags 502, 506, 510 may each determine their respective bucket numbers randomly or pseudorandomly, so that there is no correlation between their bucket numbers. The tags 502, 506, 510 may randomly or pseudorandomly determine their bucket numbers within a range of numbers, such as from zero (0) to one thousand twenty-three (1,023). In the example described with respect to FIG. 5A, tag 502 has bucket number zero (0), tag 506 has bucket number one (1), and tag 510 has bucket number two (2).

The states of the tags 502, 506, 510 may have been previously determined, such as based on previous responses to polling requests. In the example described with respect to FIG. 5A, tags 502, 506 may be in a first state or a state A, and tag 510 may be in a second state or state B.

The readers 504, 508 may independently determine which states and bucket numbers to poll (514A, 514B). The readers 504, 508 may determine the states and bucket numbers to poll asynchronously and/or at different times, without communication between the readers 504, 506. In an example implementation, the readers 504, 508 may serially poll tags 502, 506, 510 with all bucket numbers within the range of possible numbers in a random or pseudorandom order with a same state, and then poll tags 502, 506, 510 with all bucket numbers within the range of possible numbers in a random or pseudorandom number with the other state. Polling tags 502, 506, 510 with different bucket numbers and states may reduce collisions caused by responses from the tags 502, 506, 510, and polling both states may increase redundancy to ensure that responses are received from every tag 502, 506, 510 in the retail store 100. The switching of states by the tags 502, 506, 510 may cause the tags 502, 506, 510 to respond only once to each reader 504, 508, reducing noise caused by tag responses and reducing the amount of processing each reader 504, 508 needs to perform. In the example shown in FIG. 5A, reader 504 first determines (514A) to poll state A with bucket number 0, and reader 508 first determines to poll (514B) state B with bucket number 2.

The reader 504 may poll 516A the tags 502, 506, 510. The poll 516A may include the state A and the bucket number 0. Independently and/or asynchronously from the reader 504, the reader 508 may poll 516B the tags 502, 506, 510, with the poll 516B including the state B and bucket number 2.

Tag 502 may ignore the poll 516B because the state and bucket number of the poll 516B do not match the state 404 and bucket number 406 stored in the memory 400 of the tag 502. The tag 502 may respond to the poll 516A by switching state (518) from state A to state B, and by sending and/or broadcasting the identity 520 stored in the identifier 402 field of the memory 400 of the tag 502. The identity 520 may also include the state 404 (before the switching of the state (518)) and bucket number 406 of the tag 502. The reader 504 may respond to receiving the identity 520 with the state and bucket number matching the state and bucket number of the poll 516A by determining a signal strength of the identity 520 and populating the reader table 410 of the reader 504 with the identity 412 included in the identity 520, the state 414 and bucket number 416 of the poll 516A and/or included in the identity 520, the signal strength 418 determined by the reader 504, and a time 420 at which the reader 504 received the identity 520. The readers 504, 508 may respond similarly to receiving other identity messages from the tags 502, 506, 608.

The tag 506 may ignore the polls 516A, 516B based on determining that the state and bucket numbers included in the polls 516A, 516B do not both match the state 404 and bucket number 406 stored in the memory 400 of the tag 506.

Tag 510 may ignore the poll 516A because the state and bucket number of the poll 516A do not match the state 404 and bucket number 406 stored in the memory 400 of the tag 510. The tag 510 may respond to the poll 516B by switching state (519) from state B to state A, and by sending and/or broadcasting the identity 521 stored in the identifier 402 field of the memory 400 of the tag 510. The identity 521 may also include the state 404 (before the switching of the state 519) and bucket number 406 of the tag 510. The reader 508 may respond to receiving the identity 521 with the state and bucket number matching the state and bucket number of the poll 516B by determining a signal strength of the identity 521 and populating the reader table 410 of the reader 508 with the identity 412 included in the identity 521, the state 414 and bucket number 416 of the poll 516B and/or identity 521, the signal strength 418 determined by the reader 508, and a time 420 at which the reader 508 received the identity 521.

The reader 504 may ignore the broadcasted identity 521 based on the state and bucket number of the identity 521 not matching the state and bucket number of the poll 516A, and the reader 508 may ignore the broadcasted identity 520 based on the state and bucket number of the identity 520 not matching the state and bucket number of the poll 516B.

The readers 504, 508 may again generate polls (522A, 522B). While the generation of the polls (522A, 522B) are shown in FIG. 5A as being at approximately a same time, the generation (522A, 522B) need not be at a same time, because the readers 504, 508 generate and send their respective polls independently and/or asynchronously.

The reader 504 may continue to poll (522A) for tags 502, 506, 510 in state A, with a different bucket number than the poll (514A), in this poll (522A) bucket number 1. The reader 508 may continue to poll (522B) for tags 502, 506, 510 in state B, with a different bucket number than the poll (514B), in this poll (522B) bucket number 1. The reader 504 may send its poll 524A with state A and bucket number 1, and the reader 508 may send its poll 524B with state B and bucket number 1.

The tag 502 may ignore both of the polls 524A, 524B based on the states and bucket numbers of the polls 524A, 524B not matching both the state 404 and bucket number 406 stored in memory 400 of the tag 502. The tag 510 may ignore both of the polls 524A, 524B based on the states and bucket numbers of the polls 524A, 524B not matching both the state 404 and bucket number 406 stored in memory 400 of the tag 510. The tag 506 may ignore the poll 524B based on the state of the poll 524B not matching the state 404 stored in the memory 400 of the tag 506. The tag 506 may respond to the poll 524A, for which the state, A, matches the state 404 stored in the memory 400 and the bucket number matches the bucket number 406 stored in the memory 400, by switching state (526) from A to B and broadcasting the identity 528 of the tag 506 stored in the identifier 402 of the tag 506. The identity 528 may include the identifier 402, state 404 (before switching state (526)), and bucket number 406 stored in the memory 400 of the tag 506.

The readers 504, 508 may again generate polls (530A, 530B) with the same state, A for reader 504 and B for reader 508, and different bucket numbers, 2 for reader 504 and 0 for reader 508. The readers 504, 508 may send their respective polls 532A, 532B. In this example, all of the tags 502, 506, 510 may ignore the polls 532A, 532B because the states and bucket numbers included in the polls 532A, 532B do not both match the state 404 and bucket number 406 stored in the memories 400 of the respective tags 502, 506, 510.

Figure 5B:
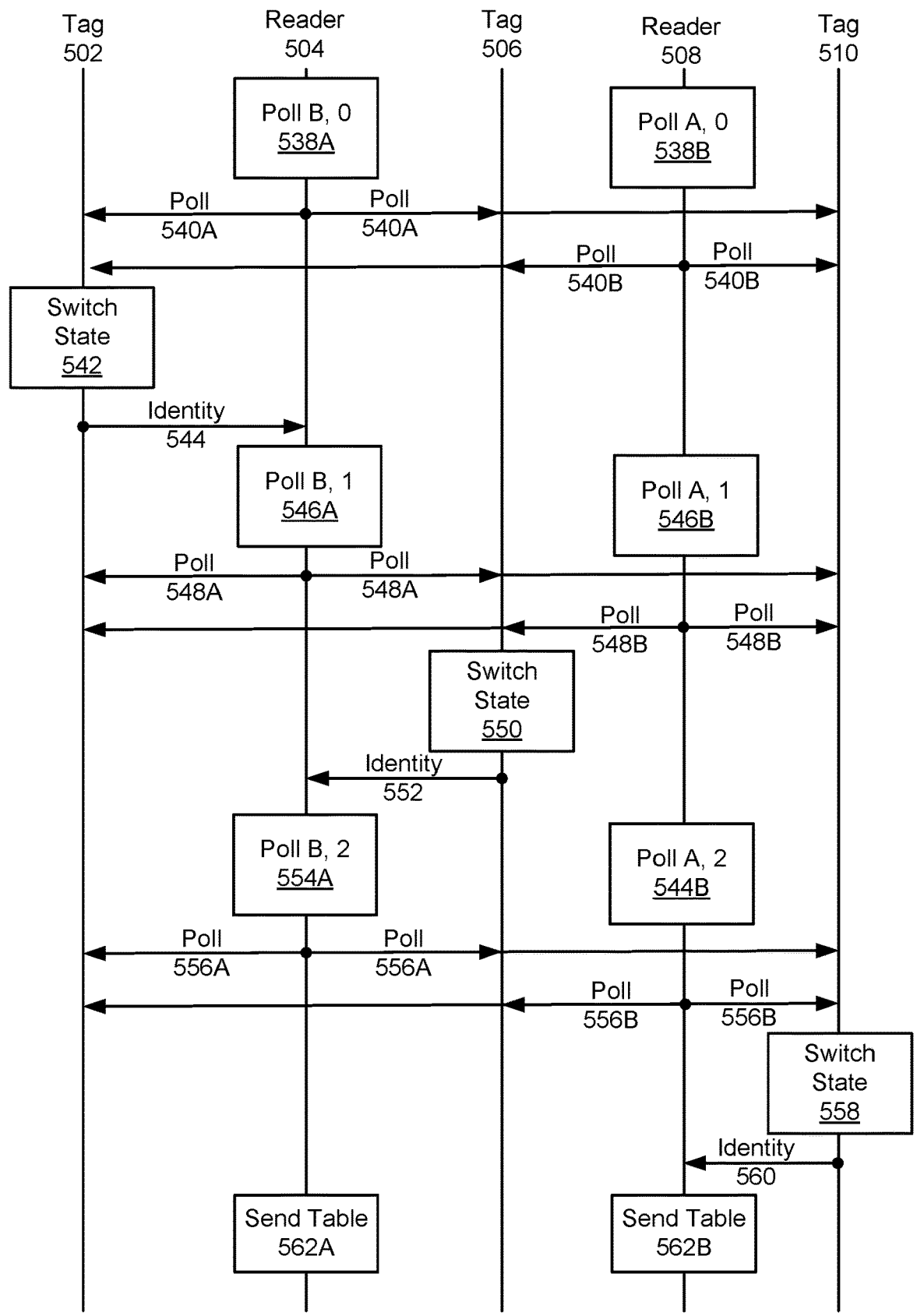
FIG. 5B is another timing diagram showing actions performed by, and messages exchanged between, tags and readers according to an example embodiment.

FIG. 5B is another timing diagram showing actions performed by, and messages exchanged between, the tags 502, 506, 510 and readers 504, 508 according to an example embodiment. FIG. 5B may be a continuation of FIG. 5A, after the readers 504, 508 have sent polls with all possible bucket numbers for a first state, and are beginning to send polls for bucket numbers in an opposite state. The polls of tags 502, 506, 510 in a first state shown and described with respect to FIG. 5A may be considered part of a first cycle, and the polls of tags 502, 506, 510 in a second state shown and described with respect to FIG. 5B may be considered part of a second cycle. Before the actions performed in this timing diagram, tag 502 may be in state B (after having switched state (518)) and still have bucket number 0, tag 506 may be in state B (after having switched state (526)) and still have bucket number 1, and tag 510 may be in state A (after having switched state (519)) and still have bucket number 2. The readers 504 may generate and send polling requests with bucket numbers in a new random or pseudorandom sequence, or with the same sequence of bucket numbers as the polling requests were sent in the previous state.

The reader 504 may generate a poll (538A) with state B and bucket number 0, and reader 508 may generate a poll (538B) with state A and bucket number 0. The reader 504 may send the poll 540A with state B and bucket number 0, and the reader 508 may send (asynchronously from reader 504) the poll 540B with state and bucket number 0.

The tags 506, 510 may ignore both polls 540A, 540B based on the states and bucket numbers included in the polls 540A, 540B not matching the states 404 and bucket numbers 406 stored in the respective memories 400 of the tags 506, 510. The tag 502 may ignore the poll 540B based on the state and bucket number included in the poll 540B not matching the state 404 and bucket number 406 stored in the memory 400 of the tag 502, but may respond to the state and bucket number included in the poll 540A matching the state 404 and bucket number 406 stored in the memory 400 of the tag 502 by switching state (542) from B to A, and broadcasting an identity 544. The identity 544 may include the identifier 402, state 404 (before the switching state (542)), and bucket number 406 stored in the memory 400 of the tag 502.

The reader 504 may generate a poll (546A) with state B and bucket number 1, and the reader 508 may generate a poll (546B) with state A and bucket number 1. The reader 504 may send a poll 548A with state B and bucket number 1, and the reader 508 may send a poll 548B with state A and bucket number 1.

The tags 502, 510 may ignore the polls 548A, 548B based on the states and bucket numbers included in the polls 548A, 548B not both matching the state 404 and bucket number 406 stored in the memories 400 of the respective tags 502, 510. The tag 506 may ignore the poll 548B based on the state included the poll 548B not matching the state 404 stored in the memory 400 of the tag 506. The tag 506 may respond to the state and bucket number of the poll 548A matching the state 404 and bucket number 406 stored in the memory 400 of the tag 506 by switching state (550) from B to A, and broadcasting an identity 552 of the tag 506. The identity 552 may include the identity 402, state 404, and bucket number 406 stored in the memory 400 of the tag 506. The reader 508 may ignore the identity 552 based on the state and bucket number included in the identity not both matching the state and bucket number of the generated poll (546B). The reader 504 may process the identity 552 and update its reader table 410 by populating the identity 412, state 414, and bucket number 416 based on the values included in the identity 552, the signal strength 418 based on the reader's 504 determination of the signal strength of the identity 552, and the time 420 based on a time that the reader 504 received the identity 552.

The reader 504 may generate a poll (554A) with state B and bucket number 2, and the reader 508 may generate a poll (544B) with state A and bucket number 2. The reader 504 may send a poll 556A with state B and bucket number 2, and the reader 508 may send a poll 556B with state A and bucket number 2.

The tags 502, 506 may ignore the polls 556A, 556B based on the states and bucket numbers included in the polls 556A, 556B not both matching the state 404 and bucket number 406 stored in the memories 400 of the respective tags 502, 506. The tag 510 may ignore the poll 556A based on the state included the poll 556A not matching the state 404 stored in the memory 400 of the tag 510. The tag 510 may respond to the poll 556B based on the state and bucket number of the poll 556B matching the state 404 and bucket number 406 stored in the memory 400 of the tag 510 by switching state (558) from A to B, and broadcasting an identity 560 of the tag 510. The identity 560 may include the identity 402, state 404 (before switching state (558), and bucket number 406 stored in the memory 400 of the tag 510. The reader 504 may ignore the identity 560 based on the state and bucket number included in the identity 560 not both matching the state and bucket number of the generated poll (556A). The reader 508 may process the identity 560 and update its reader table 410 by populating the identity 412, state 414, and bucket number 416 based on the values included in the identity 560, the signal strength 418 based on the reader's 508 determination of the signal strength of the identity 560, and the time 420 based on a time that the reader 508 received the identity 412.

After polling the tags 502, 506, 510, the readers 504, 508 may send to the server 208 their respective reader tables 410 (562A, 562B), which may include inventory reports that the readers 504, 508 generated based on the identities 520, 521, 528, 544, 552, 560 that the readers 504, 508 received from the tags 502, 506, 510.

The messages, such as polls and identities described above, may be sent as broadcast, multicast, or unicast messages. While FIGS. 5A and 5B show the readers 504, 508 sending polls once for each state and bucket number, in an example implementation, the readers 504, 508 may send and/or broadcast polls for all bucket numbers within a state multiple times before sending and/or broadcasting polls for all bucket numbers in the opposite state. For example, the readers 504, 508 may send and/or broadcast polls for all of the bucket numbers in one state two, four, or eight times, and then send and/or broadcast polls for all of the bucket numbers in the opposite state two, four, or eight times. Sending and/or broadcasting polls for all of the bucket numbers in each state multiple times may increase the redundancy of polling, reducing the likelihood that a reader 504, 508 does not receive an identity message from a given tag 502, 506, 510 at least once.

Figure 5C:
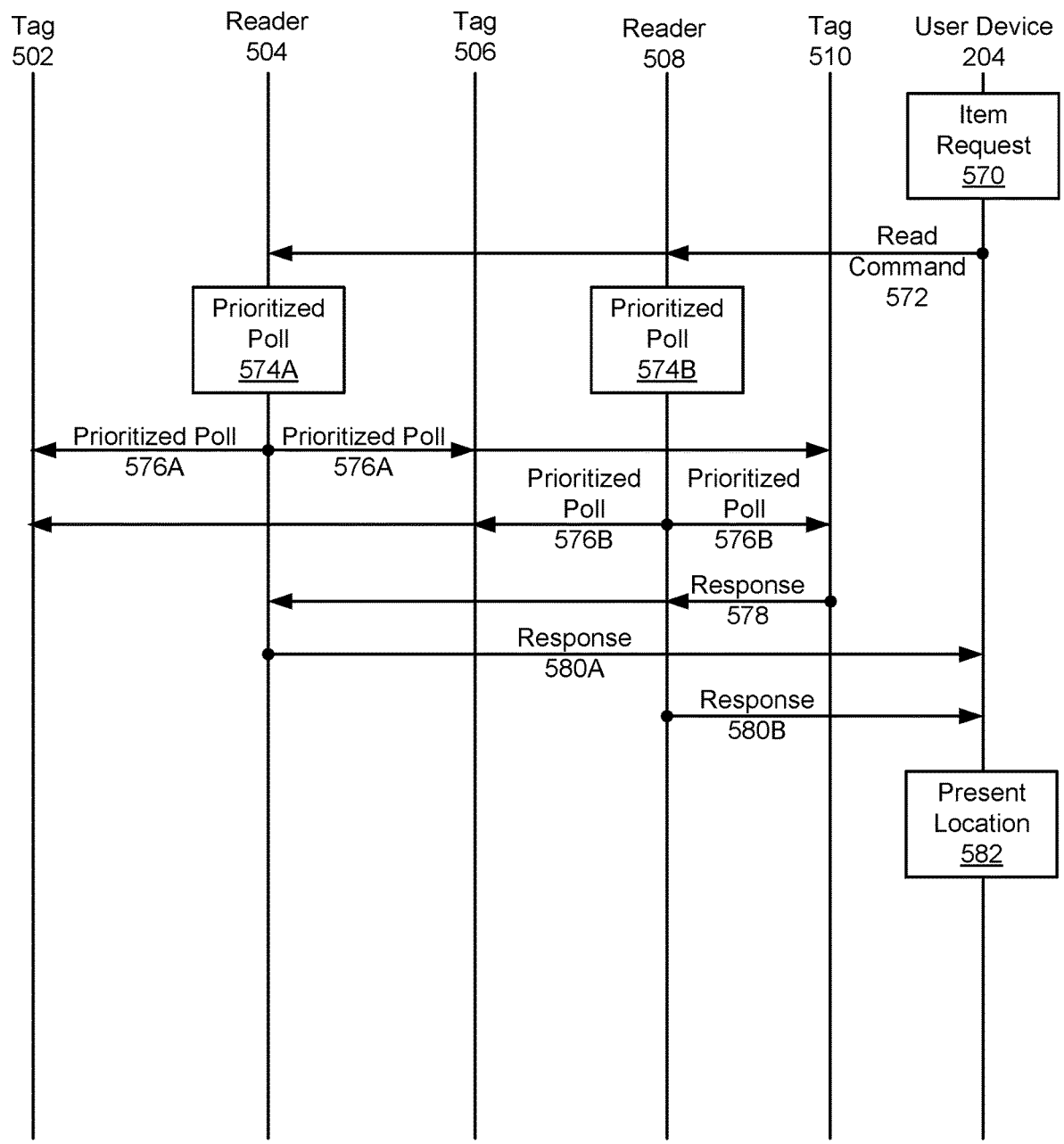
FIG. 5C is a timing diagram showing actions performed by, and messages exchanged between, tags, readers, and a user device according to an example embodiment.

FIG. 5C is a timing diagram showing actions performed by, and messages exchanged between, tags 502, 506, 510, readers 504, 508, and the user device 204 according to an example embodiment. In this example, an employee of the retail store 100 may desire to know a location of an item in the retail store 100. The employee may enter an item request (570) into the user device 204.

The user device 204 may respond to the item request (570) by sending a read command 572 to the readers 508. The read command 572 may instruct the readers 504, 508 to perform prioritized polls, interrupting and/or delaying the polls described above with respect to FIGS. 5A and 5B, to the tags 502, 506, 510 to determine the location of the item. The read command 572 may identify the item and/or type of item, such as by UPC code. The user device 204 may send the read command 572 to the readers 504, 508 via a peer-to-peer communication protocol such as WiFi communicating directly with the readers 504, 508, via a Local Area Network (LAN) and/or wireless LAN (WLAN) established by the access point 202, and/or via the Internet 206 by routing the request through the base station 210 and/or server 208.

The readers 504, 506 may generate prioritized polls (574A, 574B) and/or prioritized polling requests in response to receiving the read command 572. Generating the prioritized polls (574A, 574B) may include determining identities 402 that match the type of item and/or the UPC code of the item.

The readers 504, 508 may send and/or broadcast prioritized polls 576A, 576B and/or prioritized polling requests to the tags 502, 506, 510. The prioritized polls 576A, 576B may include the determined identities 402 that match the type of item and/or the UPC code of the item.

Tags 502, 506 which do not include any of the identities included in the prioritized polls 576A, 576B may ignore and/or not respond to the prioritized polls 576A, 576B. The tag 510 which does include one of the identities included in the prioritized polls 576A, 576B may send and/or broadcast a response 578 to the readers 504, 508. The response 578 may include a location of the tag 510, or the readers 504, 508 may determine a location of the tag 510 based on the locations of the readers 504, 508 and the signal strength that each of the readers 504, 508 determined that the response 578 had. The readers 504, 508 may send their respective responses 580A, 580B to the user device 204, either directly or via a AN, WLAN, or the Internet 206 as described above with respect to the read command 572. The user device 204 may, in response to and/or based on the received responses 580A, 580B, present the location (582) of the item to the user such as on a display of the user device 204.

Figure 5D:
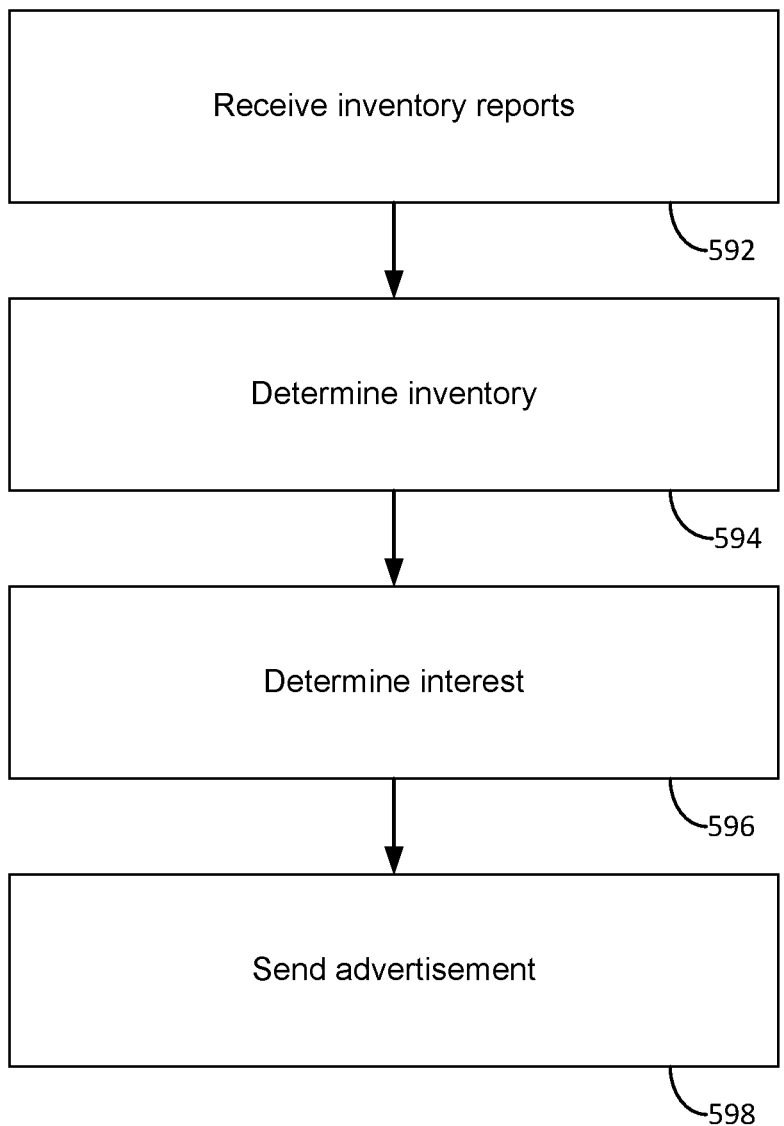
FIG. 5D is a flowchart showing a method according to an example embodiment.

FIG. 5D is a flowchart showing a method according to an example embodiment. In this example, the method may include receiving, by a server, multiple inventory reports from multiple wireless readers (592). Each of the multiple inventory reports may indicate presence of a retail item at a physical location of a retail store. The method may also include determining inventory at the physical location of the retail store based on the received multiple inventory reports (594). The determination of the inventory may be based on filtering cumulative reports of the retail item. The method may include determining that a user is interested in the retail item that is present at the physical location of the retail store (596). The method may include sending an advertisement for the retail item and location information about the retail store to the user based on the determination that the user is interested in the retail item that is present at the physical location of the retail store (598).

According to an example implementation, the determination that the user is interested in the retail item may include determining that the user is interested in the retail item based on the user's web browsing history.

According to an example implementation, the determination that the user is interested in the retail item at the physical location of the single retail store may include determining that the user is interested in the retail item at the physical location of the single retail store based on the user's web browsing history and a physical location of the user.

FIG. 6A shows a server table 440 with fields populated according to an example embodiment. The first four rows of the server table 440 may have been populated by the server 208 based on the reader table 410 that the reader 504 sent to the server 208 at (562A), and the last two rows of the server table 440 may have been populated based on the reader table 410 that the reader 508 sent to the server 208 at (562B). The first row, identifying the tag 502 as 0 at location A, may be based on the received identity 544 at time 0.1, the second row, identifying the tag 506 as 1 at location B, may be based on the received identity 552 at time 0.2, the third row, identifying tag 502 as 0 at location A, may be based on the received identity 520 at time 0.3, and the fourth row, identifying tag 506 as 1 at location B, may be based on identity 528 received at time 0.4. The fifth row, identifying tag 510 at location C, may be based on the received identity 521 at time 0.1, and the sixth row, identifying tag 510 at location C, may be based on the received identity 560 at time 0.5. The server 208 may have determined the locations 444 based on the received signal strengths 418 and the locations 436 of the readers 504, 508.

FIG. 6B shows the server table 440 of FIG. 6A with redundant fields filtered according to an example embodiment. In this example, fields in the first, second, and fifth rows may be redundant to the fields in the third, fourth, and sixth rows, respectively, because they report the same tag (based on the identity 442 of the tag). The server 440 may filter out the redundant fields that are least recent, to maintain most recent records.

FIG. 6C shows the server table 440 after the redundant fields have been filtered according to an example embodiment. The server table 440 may include three rows of fields, indicating, for each tag 502, 506, 510 detected in the retail store 100, an identity 442 of the tag 502, 506, 510, a location 444 of the tag 502, 506, 510, and a most recent time 446 at which the tag 502, 506, 510 was detected. The server 208 may maintain a server table 440 for each retail store 100, indicating which items of merchandise are present at the retail store 100, the locations where the items are in the retail store 100, and the most recent times at which the items and/or associated tags were detected.

Figure 7A:
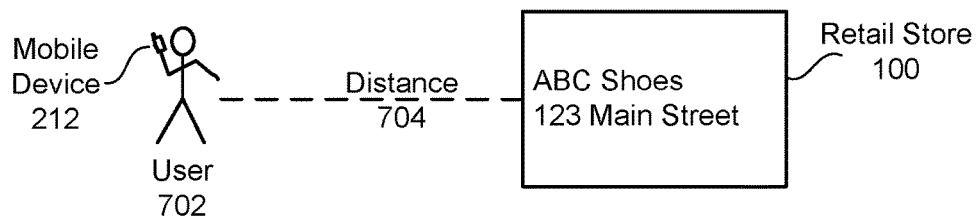
FIG. 7A shows a user near the retail store according to an example embodiment.

FIG. 7A shows a user 702 near the retail store 100 according to an example embodiment. In this example, the user 702 may be carrying the mobile device 212, which is in communication with the base station 210, as shown in FIG. 2. The user 702 and mobile device 212 may be a distance 704 from the retail store 100. The server 208 may have determined the distance 704 based on signal strength measurements from the base station 210 and/or other base station, based on communications between the mobile device 212 and access points, and/or based on Global Positioning System (GPS) determinations performed by the mobile device 212.

The server 208 may send advertisements and/or notifications to the mobile device 212 based on mobile device's 212 distance 704 from the retail store 100 and based on the user's 702 browsing history on the mobile device 212. For example, if the mobile device 212 is within the threshold distance from the retail store 100, the user's browsing history has indicated an interest in shoes, and the retail store 100 has shoes available in inventory, then the server 208 may send an advertisement or notification to the mobile device 212 that the user may find shoes at the retail store 100.

Figure 7B:
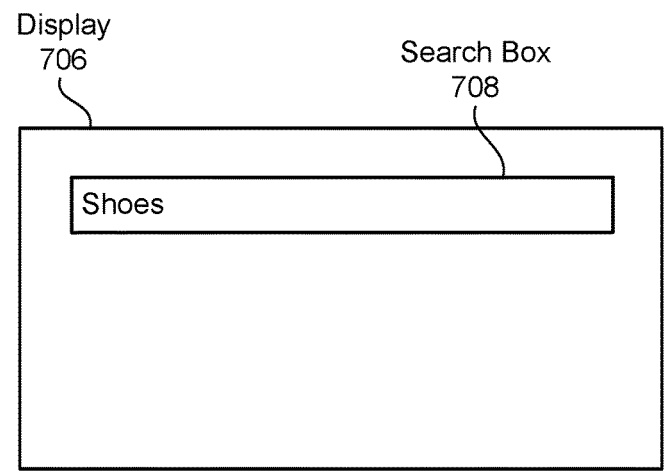
FIG. 7B shows a display with a query entered into a search box according to an example embodiment.

FIG. 7B shows a display 706 with a query entered into a search box 708 according to an example embodiment. The display 706 may be a component of the mobile device 212, and the search box 708 may be included in a browser running on the mobile device 212. The user may have inputted, "Shoes," into the search box 708 on the display 706 of the mobile device 212, causing the browsing history of the user 702 to indicate an interest in shoes. Based on the user's 702 browsing history indicating an interest in shoes and the distance 704 of the mobile device 212 and/or user 702 from the retail store 100 indicating proximity to the retail store 100, and the server table 440 associated with the retail store 100 indicating that shoes that the user 702 may desire (such as based on determined characteristics of the user such as gender, height or shoe size, and/or brand or style preferences), the server 208 may send an advertisement or notification to the mobile device 212 to suggest the user 702 find shoes at the retail store 100.

Figure 7C:
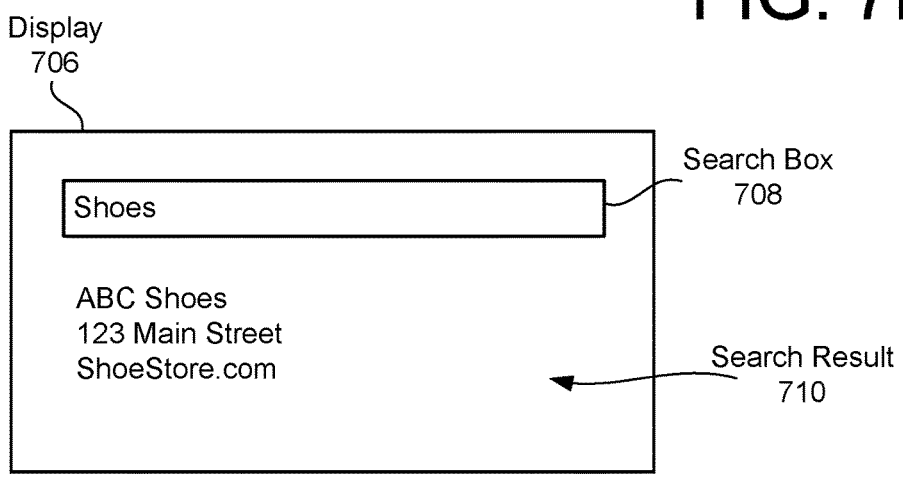
FIG. 7C shows the display of FIG. 7B with search results returned after the query was entered into the search box according to an example embodiment.

FIG. 7C shows the display of FIG. 7B with search results 710 returned after the query was entered into the search box 708 according to an example embodiment. In this example, based on the user's 702 browsing history indicating an interest in shoes and the distance 704 of the mobile device 212 and/or user 702 from the retail store 100 indicating proximity to the retail store 100, and the server table 440 associated with the retail store 100 indicating that shoes that the user 702 may desire are present at the retail store 100, the server 208 may send an advertisement or notification, such as a search result including the name, address, and Uniform Resource Locator (URL) of the retail store 100, to the mobile device 212 to suggest the user 702 find shoes at the retail store 100.

Figure 8:
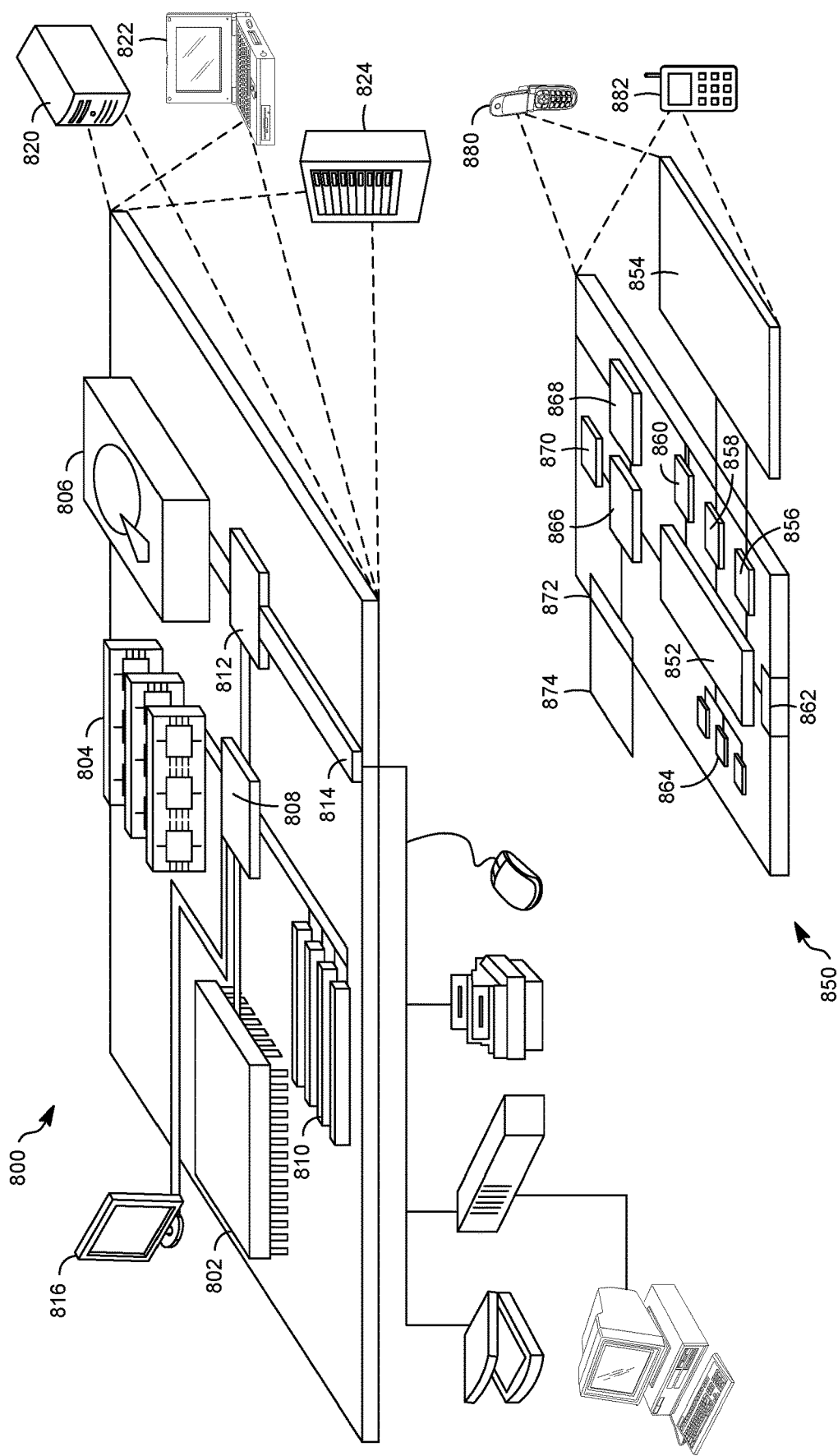
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A wireless reader comprising:
   at least one transceiver configured to transmit and receive wireless signals;
   at least one processor configured to execute instructions stored in memory and generate and process signals transmitted and received by the at least one transceiver; and at least one memory comprising instructions stored thereon that, when executed by the at least one processor, are configured to cause the wireless reader to at least:

send multiple polling requests to multiple tags in a first cycle, the polling requests in the first cycle each identifying a different bucket number within a range of bucket numbers and instructing tags with a first state and the identified bucket number to respond with their respective identifier and switch to a second state opposite from the first state; and after sending the multiple polling requests in the first cycle, send multiple polling requests to the multiple tags in a second cycle, the polling requests in the second cycle each identifying a different bucket number within the range of bucket numbers and instructing tags with the second state and the identified bucket number to respond with their respective identifier and switch to the first state opposite from the second state.

2. The wireless reader of claim 1, wherein the wireless reader includes a radio frequency identification (RFID) reader.

3. The wireless reader of claim 1, wherein the wireless reader is mounted on a lighting fixture and is configured to draw power from a same power source as the lighting fixture.

4. The system of claim 1, wherein the wireless reader is configured to serially send polling requests with all possible bucket numbers.

5. The system of claim 1, wherein the at least one memory comprises further instructions stored thereon that, when executed by the at least one processor, are configured to cause the wireless reader to send the respective identifier of the tags and a location of the wireless reader to a remote computing server.

6. The system of claim 1, wherein the at least one memory comprises further instructions stored thereon that, when executed by the at least one processor, are configured to cause the wireless reader to send the multiple polling requests to the multiple tags in the first cycle in response to receiving a command from a smartphone.

7. The system of claim 6, wherein the multiple polling requests in the first cycle identifying one or more specific tags identified in the command.

8. The system of claim 6, wherein the at least one memory comprises further instructions stored thereon that, when executed by the at least one processor, are configured to cause the wireless reader to send one or more specific tags identified in the command and a location of the wireless reader to a remote computing server.

9. The system of claim 8, wherein the at least one memory comprises further instructions stored thereon that, when executed by the at least one processor, are configured to cause the wireless reader to send one or more specific tags identified in the command and received signal strength to the remote computing server, the remote computing server determining the location of the one or more specific tags based on the received signal strength.

10. The system of claim 1, wherein the at least one memory comprises further instructions stored thereon that, when executed by the at least one processor, are configured to cause the wireless reader to generate an inventory report based on the identifier received from each respective tag.

11. The system of claim 10, wherein the at least one memory comprises further instructions stored thereon that, when executed by the at least one processor, are configured to cause the wireless reader to send the generated inventory report to a remote computing server.

* * * * *